United States Patent
Ishikura et al.

(10) Patent No.: US 7,303,286 B2
(45) Date of Patent: Dec. 4, 2007

(54) PROJECTION DISPLAY DEVICE

(75) Inventors: Naofumi Ishikura, Tokyo (JP); Jun Ogawa, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 0 days.

(21) Appl. No.: 11/649,072

(22) Filed: Jan. 3, 2007

(65) Prior Publication Data
US 2007/0109507 A1    May 17, 2007

Related U.S. Application Data

(63) Continuation of application No. 10/916,173, filed on Aug. 11, 2004, now Pat. No. 7,178,920.

(30) Foreign Application Priority Data
Aug. 14, 2003    (JP)    ............................ 2003-293267

(51) Int. Cl.
G03B 21/28 (2006.01)
G03B 21/00 (2006.01)
G03B 21/20 (2006.01)
G02B 3/06 (2006.01)
G02B 5/04 (2006.01)
G02F 1/00 (2006.01)
H04N 5/74 (2006.01)

(52) U.S. Cl. ............................ 353/81; 353/33; 353/37; 353/99; 353/102; 359/710; 359/833; 348/771

(58) Field of Classification Search .................. 353/81, 353/31, 33, 37, 98, 99, 102; 359/495–497, 359/500, 583, 710, 831, 833, 834, 837; 349/57, 349/58, 113; 348/642, 744, 756, 757, 771
See application file for complete search history.

(56) References Cited

U.S. PATENT DOCUMENTS

| 2,178,245 | A | 10/1939 | Schwarz ...................... 359/638 |
| 2,963,937 | A | 12/1960 | Raitiere ...................... 359/637 |
| 6,429,954 | B1 | 8/2002 | Kasai .......................... 359/13 |
| 6,747,805 | B2 * | 6/2004 | Sayag ........................ 359/664 |
| 2002/0015136 | A1 | 2/2002 | Sawamura et al. ........... 353/33 |
| 2003/0058414 | A1 | 3/2003 | Yahagi ........................ 359/69 |
| 2003/0123162 | A1 | 7/2003 | Penn .......................... 359/833 |

FOREIGN PATENT DOCUMENTS

| JP | 02-149882 | 6/1990 |
| JP | 06-201905 | 7/1994 |
| JP | 09-101511 | 4/1997 |

(Continued)

Primary Examiner—Rochelle Blackman
(74) Attorney, Agent, or Firm—Scully, Scott, Murphy & Presser, P.C.

(57) ABSTRACT

In a projection display device that is provided with a relay lens for converting flux that is emitted from a light source to a parallel flux for illuminating an image display element (DMD), and a total internal reflection prism for both directing flux that is emitted from the relay lens to the DMD and directing flux that is reflected by the DMD toward a projection lens, the relay lens is unified with the prism as a lens-integral prism by bonding the relay lens to the total internal reflection surface of the prism.

18 Claims, 7 Drawing Sheets

FOREIGN PATENT DOCUMENTS

| | | |
|---|---|---|
| JP | 10-078550 | 3/1998 |
| JP | 11-002780 | 1/1999 |
| JP | 2000-206451 | 7/2000 |
| JP | 2000-206455 | 7/2000 |
| JP | 2000-206610 | 7/2000 |
| JP | 2001-311907 | 11/2001 |
| JP | 2002-0490904 | 2/2002 |
| JP | 2002-090505 | 3/2002 |
| JP | 2002-090696 | 3/2002 |
| JP | 2002-156602 | 5/2002 |
| JP | 2002-221688 | 8/2002 |
| JP | 2002-228968 | 8/2002 |
| JP | 2002-311378 | 10/2002 |
| JP | 2002-311380 | 10/2002 |
| JP | 2002-318366 | 10/2002 |
| JP | 2002-333596 | 11/2002 |
| JP | 2003-015041 | 1/2003 |
| JP | 2003-035869 | 2/2003 |
| JP | 2004-246363 | 9/2004 |

\* cited by examiner

Fig. 8

| | | 2 | 3 | |
|---|---|---|---|---|
| F-number | | | | Fixed |
| Index of Refraction | n | 1.517 | 1.517 | Fixed |
| DMD Size (mm) | x | 14.00 | 14.00 | Fixed |
| | y | 10.50 | 10.50 | Fixed |
| Distance (mm) | z | 10.00 | 10.00 | Fixed |
| Angle of Spread (°) | θ | 14.48 | 9.59 | Variable |
| Optical Axis Shift (°) | α | 5.00 | 5.00 | Fixed |
| Angle of Emission (°) | β | 3.29 | 3.29 | Fixed |
| | ω | 1.48 | 0.134 | Variable |
| | φ | 8.03 | 6.44 | Variable |
| Critical Angle (°) | θc | 41.25 | 41.25 | Variable |
| Prism Angle (°) | γ | 42.72 | 41.11 | Variable |
| Length of Side (mm) | AC,BC | 16.52 | 15.18 | Variable |
| | AB | 24.28 | 22.88 | Variable |
| Thickness (mm) | Y | 17.24 | 14.71 | Variable |

PROJECTION DISPLAY DEVICE

CROSS REFERENCE TO RELATED APPLICATION

The present application is a continuation application of U.S. patent application Ser. No. 10/916,173 filed on Aug. 11, 2004 now U.S. Pat. No. 7,178,920, which claims the benefit of priority of Japanese patent application 2003-293267 filed on Aug. 14, 2003, which is incorporated herein by reference.

BACKGROUND OF THE INVENTION

1. Field of the Invention

The present invention relates to a projection display device that is provided with a reflective image display element, and more particularly, to prism optics for both guiding illuminating light to an image display element and guiding the light that is reflected from the image display element to projection optics.

2. Description of the Related Art

The development of projection display devices has made rapid strides in recent years, and demand is growing for more compact and lower-cost projectors. This demand is accompanied by a growing need for more compact devices that for use in projection display devices. Meeting this demand calls for the development of more compact peripheral parts, and in particular, for more compact optics that accompany the reduction of the size of these devices, so that the overall size of a projection display device can be decreased. Recent years have seen the development of the time-division image projection device having a basic structure that extracts and projects the colors red, green, and blue in time divisions. For example, as disclosed in Japanese Patent Laid-Open Publication No. 78550/98, a DMD projector is known that uses a digital mirror device (hereinbelow abbreviated "DMD"), in which several hundred thousand individual mirror elements having various controllable inclinations are attached over semiconductor memory cells, whereby the inclination of each mirror element is manipulated to control the reflection state and thus form an image.

As shown in FIG. 1, this DMD projector is configured such that light that is emitted from light source 101 is reflected by reflecting mirror 102 and then condensed by condensing lens 103 to one point of color wheel 104 in which color filters that selectively pass red, green and blue light are combined. The light that is thus passed is made uniform by integrator rod 105, irradiated as a parallel flux by optics 109 such as a relay lens onto DMD 107 by way of TIR prism (total internal reflection prism) 106, and the image light, which is the light reflected by DMD 107, is projected by way of zoom projection lens 108 onto a screen. In this case, TIR prism 106 is configured such that two prisms having different indices of refraction are bonded together, whereby the illumination light that is irradiated onto the bonded surface is reflected and irradiated upon DMD 107, and light that is reflected from DMD 107 is transmitted through the bonded surface and emitted from prism 106 to projection lens 108. Regarding the structure of this TIR prism, the configuration disclosed in Japanese Patent No. 3060049 or Japanese Patent No. 3065058 may be adopted.

The TIR prism in this DMD projector of the prior art has a configuration in which two prisms are bonded for total reflection as well as transmission of illumination light. In addition, this TIR prism requires the previously described light-condensing relay lens in the stage preceding the TIR prism. This arrangement results in an increase in space for mounting the optical element portion that is disposed in the space between the integrator rod and the projection lens and therefore poses a serious obstacle to creating a compact projection display device. The same problem exists in a projection display device that employs a reflective liquid crystal panel as the image display element.

SUMMARY OF THE INVENTION

It is an object of the present invention to provide a compact projection display device in which a single prism and a single relay lens make up the optics for illuminating the image display element.

In a projection display device that is provided with: a relay lens for making flux that is emitted from a light source, a parallel flux for illuminating an image display element, and a total internal reflection prism that both guides the flux that is emitted from the relay lens to the image display element and directs the flux that is reflected by the image display element toward a projection lens; the feature of the present invention is the unification of the relay lens with the prism by bonding the relay lens to the total internal reflection surface of the prism.

The present invention, by bonding a single lens to a single prism, not only allows flux that is emitted from a light source to be irradiated upon an image display element, but also allows the light that is reflected from the image display element to be directed toward the projection lens, whereby, in comparison with a device that is configured with separate relay lens and TIR prism as in the prior art, the present invention enables a reduction of the cubic volume and space of the optics, allows the realization of a more compact projection display device, and further, achieves a lower cost. In addition, despite this configuration, the flux that is incident to the prism and the flux that is emitted from the prism are directed in different directions, and as a result, no interference occurs between the incident flux and the emitted flux.

The above and other objects, features, and advantages of the present invention will become apparent from the following description with reference to the accompanying drawings, which illustrate examples of the present invention.

BRIEF DESCRIPTION OF THE DRAWINGS

FIG. 8 is a table showing examples of the minimum dimensions of a lens-integral prism.

DETAILED DESCRIPTION OF THE PREFERRED EMBODIMENTS

In the present invention, a prism is configured such that the sectional profile in the direction along the optical axis is an isosceles triangle, the surface of the base of this triangle is the total internal reflection surface, one of the inclined surfaces is arranged to confront the image display elements, and the other inclined surface is arranged to confront the projection lens. In this case, a micro-spaced air gap is preferably interposed at the bonded surface between the relay lens and prism. In this case, the relay lens is bonded to the prism using an adhesive with added glass beads to realize bonding in a state that maintains a micro-spacing between the relay lens and prism. In addition, the relay lens is constituted by a plano-convex lens, and is configured with its flat surface bonded to the total internal reflection surface of the prism. The lens edge and sand-floated surface of the relay lens are preferably subjected to a black-coating process. Still further, reinforcing plates are preferably arranged for joining the relay lens and prism.

Figure 1:
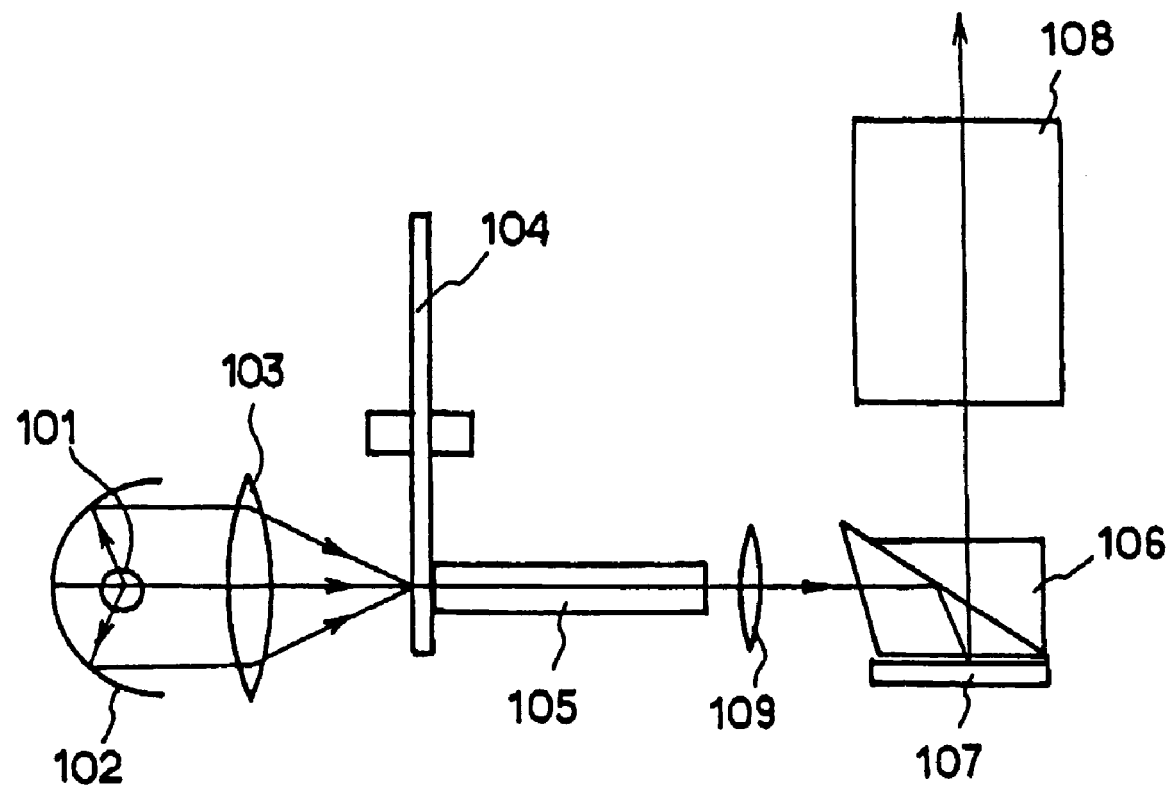
FIG. 1 shows the configuration of an example of a projection display device of the prior art.
Figure 2:
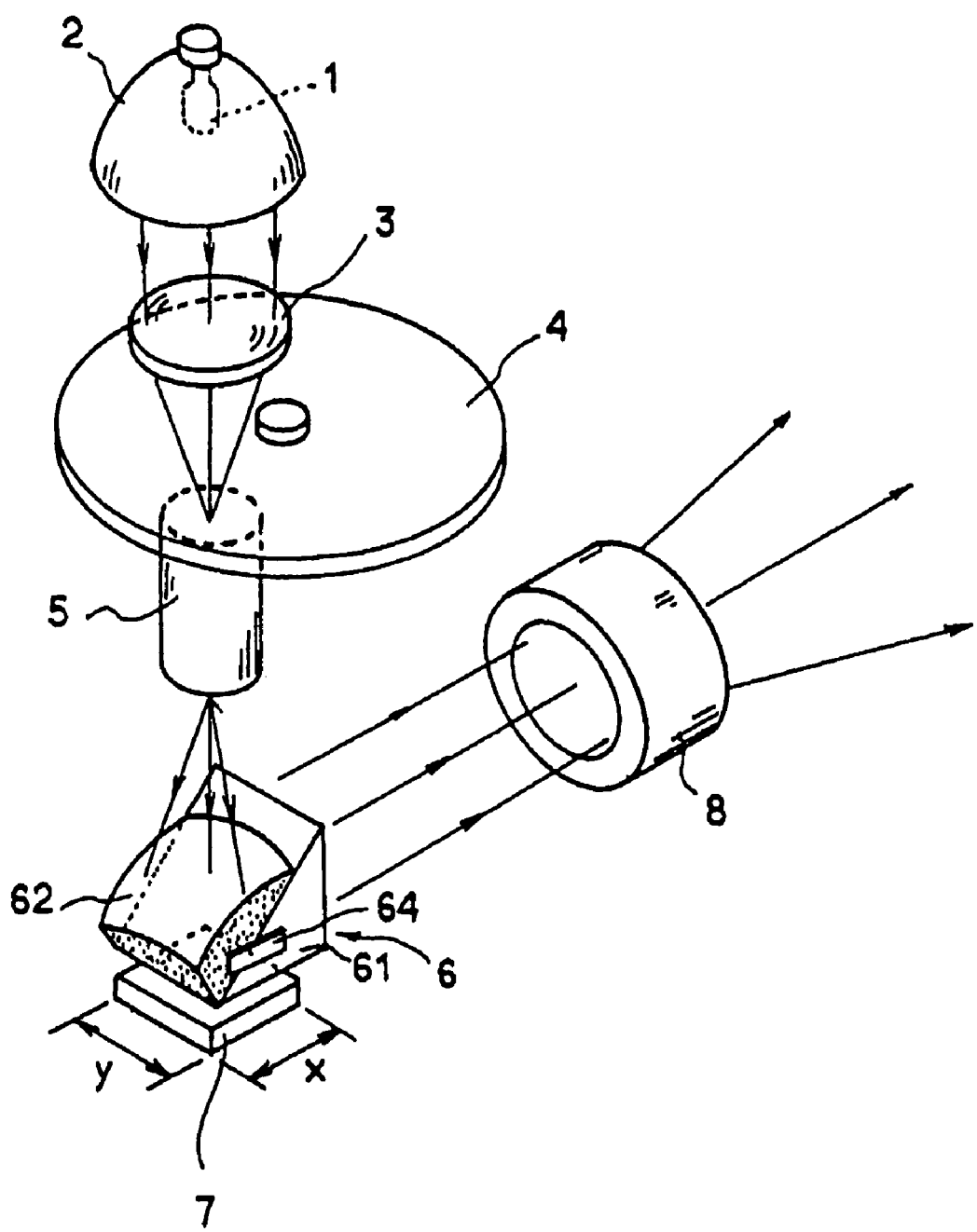
FIG. 2 is a perspective view showing the general configuration of a projection display device of the present invention.
Figure 3:
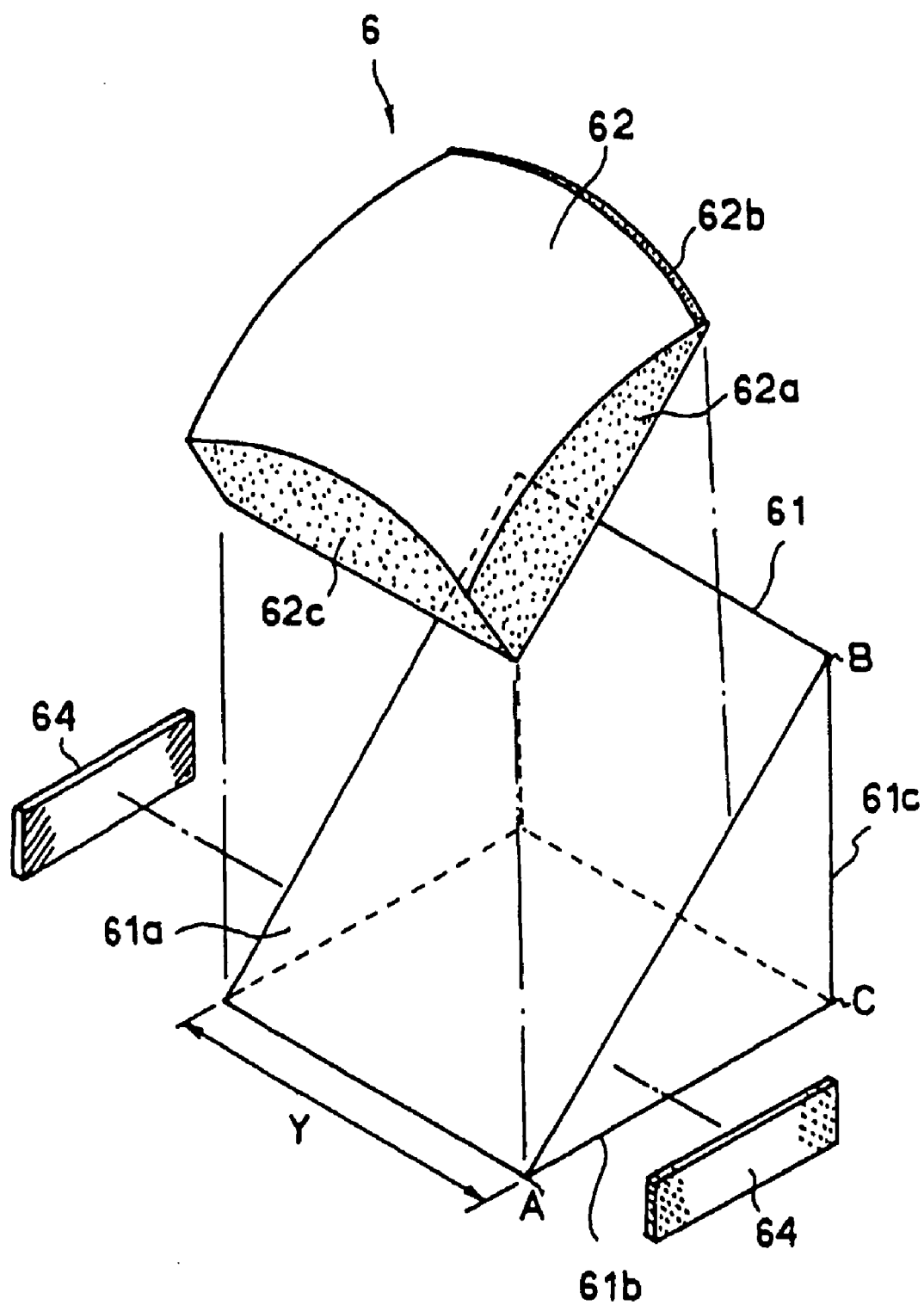
FIG. 3 is an exploded perspective view of a lens-integral prism.

A working example of the present invention is next explained with reference to the figures. FIG. 2 is an overall view of a DMD projector that employs a DMD as a reflective image display element. Parts that are the same as in the prior art are given the same reference numerals. Light that is emitted from light source 1 is reflected by reflecting mirror 2, condensed by condensing lens 3 to one point of color wheel 4 in which color filters that selectively pass red, green, and blue light are combined, and this passed light is then made uniform by integrator rod 5. The light that is emitted from integrator rod 5 is incident to one surface of lens-integral prism 6 according to the present invention, emitted from the other surface as a parallel flux, and illuminates DMD 7, which is the image display element. The image light, which is the reflected light of DMD 7, is irradiated into lens-integral prism 6, again emitted from the other surface, and projected onto a screen (not shown) by way of projection lens 8 having a zoom configuration.

Lens-integral prism 6 is composed of prism 61 in which the sectional profile is an isosceles triangle and relay lens 62 that is bonded to base surface 61a of this prism 61. The two inclined surfaces 61b and 61c that are on either side of base surface 61a of prism 61 are each formed as a square or rectangle, one inclined surface 61b being arranged so as to confront DMD 7, and the other inclined surface 61c being arranged to confront projection lens 8. Relay lens 62 is configured with portions cut from the circumference of a plano-convex lens, flat surface 62a being bonded to base surface 61a of prism 61. Relay lens 62 is a construction that is subjected to a blackening process to suppress stray light that is diffusely reflected by surfaces having a curved portion, i.e., (lens edge) 62b and the cut surfaces of the lens (sand-floated surface) 62c.

Figure 4:
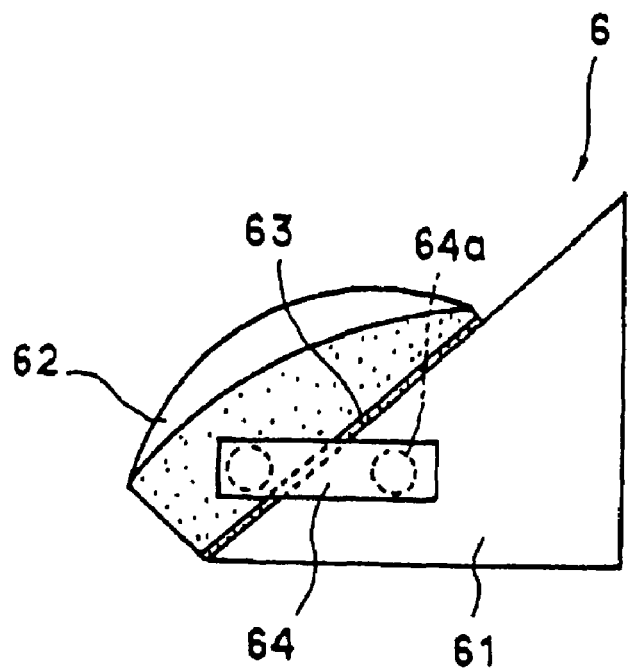
FIG. 4 is a side view of the lens-integral prism in an assembled state.

In addition, the bonding surface of relay lens 62 and prism 61 is configured so as to have air gap 63 of micro dimensions between the confronting surfaces as shown in FIG. 4, and the difference between the index of refraction of prism 61 and the index of refraction of air causes total internal reflection at the inner surface of base surface 61a of prism 61. A UV-hardening adhesive with a glass bead additive is used to produce this air gap 63, the adhesive being applied over the entire surface or edges of the bonding surfaces and the two surfaces then bonded together to ensure a gap that corresponds to the diameter dimension of the glass beads. Further, in this case, a configuration is adopted for preventing a split between relay lens 62 and prism 61 caused from degrading the bonding strength between the two components by the heat of the light source, which is produced when driving the projector. According to this configuration, reinforcing plates 64 composed of glass plates are adhered by adhesive 64a to surfaces that have no relation to the transmission and reflection of light, for example, to at least one surface that is parallel to the plane of FIG. 4. The area of adhesion of adhesive 64a that is used at this time is greater than the area of adhesion between relay lens 62 and prism 61 and the adhesive strength is therefore stronger than the adhesion between relay lens 62 and prism 61. In other words, reinforcing plates 64 have greater resistance to the failure of adhesion resulting from heat.

Figure 5:
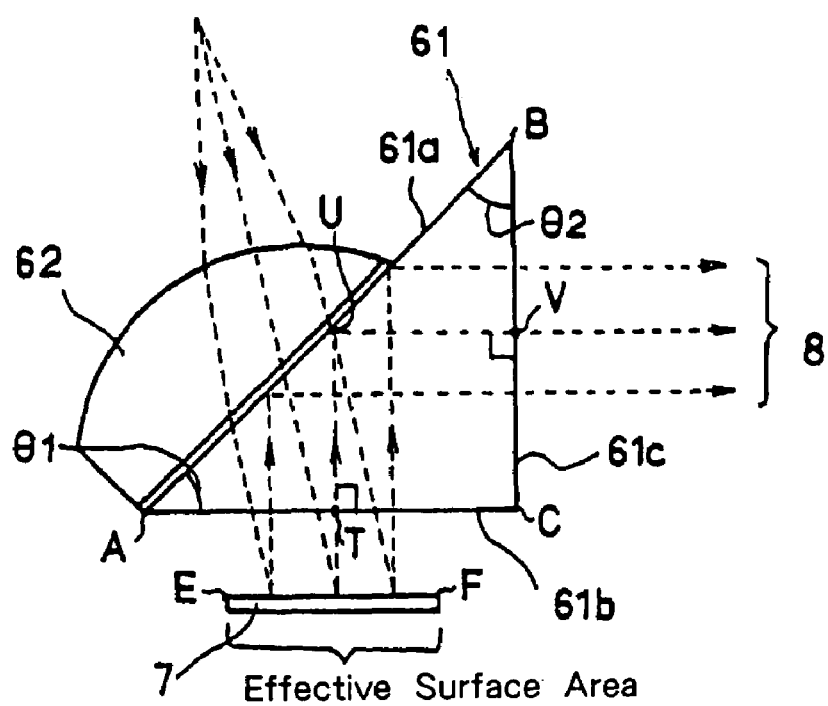
FIG. 5 is a schematic side view showing the light path in the lens-integral prism.

By means of lens-integral prism 6 that is thus constituted, flux from light source 1 is emitted from integrator rod 5 in a diffuse state, directed to the convex surface of relay lens 62, emitted from the planar surface of relay lens 62 as a parallel beam, and then directed into base surface 61a of prism 61, as shown by the light path in FIG. 5. The flux that is incident to prism 61 is transmitted in the interior of prism 61 and emitted from one inclined surface 61b to irradiate DMD 7. The flux that has been optically modulated by reflection at DMD 7 is again directed into prism 61 from one inclined surface 61b, projected on the inner surface of base surface 61a at an angle with respect to base surface 61a that is greater than the critical angle, and is here subjected to total internal reflection. The critical angle is the angle of incidence at which total internal reflection occurs at the interface where light is irradiated at a particular angle from a medium having a high index of refraction (index of refraction n1) to a medium having a low index of refraction (index of refraction n0), critical angle $\theta c$ being represented by sin $\theta c = n0/n1$. Light that undergoes total internal reflection at base surface 61a is emitted from the other inclined surface 61c of prism 61 and directed to projection lens 8, whereby the image that is displayed by DMD 7 is projected onto a screen (not shown) by projection lens 8.

As described in the foregoing explanation, by adhering a single relay lens 62 to a single prism 61 in lens-integral prism 6 of the present working example, flux that is emitted from integrator rod 5 can be irradiated into DMD 7, and the reflected light from DMD 7 can be guided to projection lens 8. Thus, compared to a case in which a condensing lens and TIR prism are realized as separate components as in the prior art, the space and volume of the optics can be reduced and a more compact projection display device can be realized. Further this configuration, compared to a configuration that requires one lens and two prisms as in the prior art, enables the elimination of one prism and therefore can realize a reduction in cost. Still further, the flux that is incident to prism 61 has a different direction than the flux that is emitted from the same prism 61, and interference is therefore not produced between the incident flux and the emitted flux.

In the present working example, air gap 63 is provided at the bonding surface between relay lens 62 and prism 61 to secure the critical angle for producing total internal reflection of the light that is reflected from DMD 7, but relay lens 62 and prism 61 may also be bonded by using an adhesive sheet or transparent adhesive having a low index of refraction and having superior light permeability. Alternatively, relay lens 62 and prism 61 can also be bonded in a directly contacting state when the index of refraction of relay lens 62 is lower than the index of refraction of prism 61.

The nest explanation is regard to an example of forming lens-integral prism 6 of the present invention in the minimum compact size. First, in prism 61 in FIG. 5, DMD 7 and one inclined surface 61b (surface AC in FIG. 5) must be parallel, and projection lens 8 and the other inclined surface 61c (surface BC in FIG. 5) must be parallel, whereby the optical axis of inclined surface 61b is always perpendicular to the optical axis of inclined surface 61c. Accordingly, angle ATU and angle BVU are each 90°. In addition, the angle of incidence and the angle of reflection of a light ray are equal, and angle AUT is equal to angle BUV, and triangle ATU is similar to triangle BVU. The two side angles θ1 and θ2 of prism 61 are therefore equal and prism 61 can be recognized as an isosceles triangle.

The nest explanation is regard to the size of prism 61. Prism 61 must be large enough to receive and emit all flux that are reflected by the effective area of DMD 7. For this purpose, the conditions that are necessary for finding the size and shape of a prism that can subject all flux to total internal reflection, and moreover, that can contain all flux that are reflected by the effective area of DMD 7 are shown; and the minimum size of a prism that satisfies the conditions is found by substituting the fixed values (the F-number of projection lens 8 and the size of the effective area of DMD 7) in the conditional expression that has been found.

Figure 6:
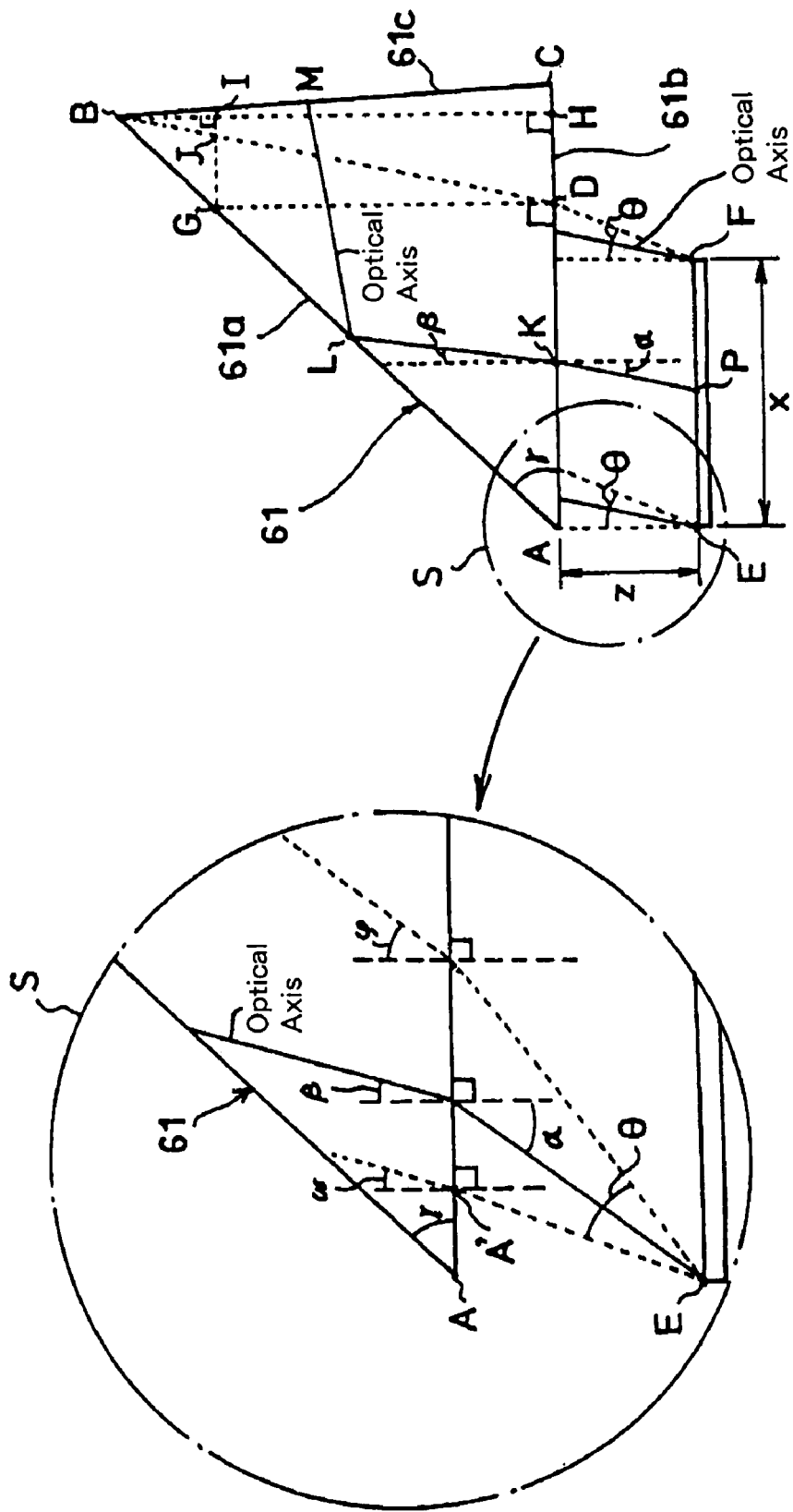
FIG. 6 is a schematic side view for explaining the method of finding the minimum dimensions of the lens-integral prism.

The schematic figure of FIG. 6 is used to explain the calculation of the minimum size of prism 61 based on the size of the effective area of DMD 7 and the F-number of projection lens 8. The drawing on the left side of the figure is an enlarged detail of the portion that is enclosed within circle S on the right side of the figure. Flux that are reflected by the two ends of effective area surface EF of DMD 7 have a spread of angle θ, and are incident to one inclined surface 61b (hereinbelow referred to as the "incident surface") AC of the prism. One of the conditions for the smallest size of prism 61 is that light ray AE, that is on the extreme left, be incident to apex A of the prism (that AA' be equal to 0). One of the conditions for the smallest size of the prism is that light ray DF on the extreme right enter incident surface AC of prism 61 and be incident to the extreme end (apex B) of inclined surface 61a of prism 61 (surface AB in FIG. 6 and referred to as the "total internal reflection surface"). The minimum size of prism 61 is determined by satisfying these two conditions, and moreover, by satisfying the condition that light ray AE enter incident surface AC and that the angle of incidence of this ray to the total internal reflection surface AB of the prism be the critical angle.

Light rays that are reflected by the two ends of the effective area of DMD 7 have a fixed spread, and the angle of this spread is determined by the F-number of projection lens 8. The relation between the F-number and spread is represented by:

$$F=1/(2 \sin \theta) \quad \text{(Equation 1)}$$

where F is the F-number and θ is the angle of spread.

If α is the angle between the optical axis of flux that is reflected by DMD 7 and a line that is perpendicular to the incident surface AC of prism 61, n is the index of refraction of prism 61, ω is the angle of emission of a light ray on the extreme left that is incident to incident surface AC, β is the angle of refraction of the optical axis when incident to incident surface AC, and ψ is the angle of emission of a light ray on the extreme right end, Snell's Law gives:

$$n \cdot \sin \beta = \sin \alpha \quad \text{(Equation 2)}$$

$$n \cdot \sin \omega = \sin|\alpha - \theta/2| \quad \text{(Equation 3)}$$

$$n \cdot \sin \psi = \sin(\alpha + \theta/2) \quad \text{(Equation 4)}$$

If γ is the angle of apex A of prism 61, and θc is the critical angle, then a condition is held that is satisfied by:

$$\theta c \geq \gamma - \omega \quad \text{(Equation 5)}$$

when $\alpha \leq \theta/2$, and:

$$\theta c \geq \gamma + \omega \quad \text{(Equation 6)}$$

when $\alpha \geq \theta/2$. Here, if the index of refraction of air is 1, then $$\sin \theta c = 1/n \quad \text{(Equation 7)}$$

As a result, when the angle of incidence of the end flux is the critical angle, then γ is found from:

$$\gamma = \theta c \pm \omega = \sin^{-1}(1/n) \pm \omega \quad \text{(Equation 8)}$$

For prism 61 to subject all flux to total internal reflection, all flux must first be incident to incident surface AC. The ability of light ray FD on the extreme right to enter incident surface AC and be incident to total internal reflection surface AB is also a condition for determining the size of prism 61. Considering isosceles triangle ABC (AC=BC), the length of AD is:

$$AD = x + z[\tan(\alpha + \theta/2) - \tan|\alpha - \theta/2|] \quad \text{(Equation 9)}$$

where x is the length of the sides of DMD 7 that are parallel to the plane of the figure, y is the length of the sides that are perpendicular to the plane of the figure (in the direction of depth of the figure), z is the distance between prism 61 and DMD 7, and D is the point of incidence of the flux on the extreme right that is incident to incident surface AC from DMD 7.

If G is the point of intersection between the line that is perpendicular to incident surface AC at point of incidence D and total internal reflection surface AB, H is the point of intersection between the perpendicular line that descends from apex B and incident surface AC, I is the point of intersection of perpendicular BH and the line that is perpendicular to BH that passes through point G, and J is the point of intersection between BD and GI, then:

$$AG = AD/\cos \gamma \quad \text{(Equation 10)}$$

$$HI = DG = AD \cdot \tan \gamma \quad \text{(Equation 11)}$$

Further, based on the triangle GDJ:

$$GJ = DG \cdot \tan \omega \quad \text{(Equation 12)}$$

Still further, based on triangles ABD and GBJ:

$$AG:AD = GB:GJ \quad \text{(Equation 13)}$$

From this relation is obtained:

$$GB = AG \cdot GJ/AD \quad \text{(Equation 14)}$$

Substituting Equation 10 and Equation 11 for AG and GJ of Equation 14 yields:

$$GB = [(AD/\cos \gamma) \times (DG \cdot \tan \psi)]/AD \quad \text{(Equation 15)}$$

Further, substituting Equation 11 for DG of Equation 15 yields:

$$GB = [(AD/\cos \gamma) \times (AD \cdot \tan \gamma \cdot \tan \psi)]/AD = AD \cdot \tan \gamma \cdot \tan \psi/\cos \gamma \quad \text{(Equation 16)}$$

Based on triangle BGI:

$$BI = GB \cdot \sin \gamma \quad \text{(Equation 17)}$$

Substituting Equation 16 for GB of Equation 17 yields:

$$BI = AD \cdot \tan\gamma \cdot \tan\psi \cdot \sin\gamma/\cos\gamma = AD \cdot \tan^2\gamma \cdot \tan\psi \quad \text{(Equation 18)}$$

Based on the relation angle ABC=angle BAC=$\gamma$:

$$\text{Angle } BCH = \pi - 2\gamma \quad \text{(Equation 19)}$$

Based on triangle BCH:

$$BC = BH/\sin(\pi - 2\gamma) = [BI + HI]/\sin 2\gamma \quad \text{(Equation 20)}$$

Substituting Equation 18 and Equation 11 for BI and HI of Equation 20 yields:

$$AC = BC = (AD \cdot \tan^2\gamma \cdot \tan\psi + AD \cdot \tan\gamma)/\sin 2\gamma = AD \cdot \tan\gamma(\tan\gamma \cdot \tan\psi + 1)/\sin 2\gamma = AD \cdot (\tan\gamma \cdot \tan\psi + 1)/2\cos^2\gamma \quad \text{(Equation 21)}$$

Still further:

$$BH = AD \cdot \tan\gamma \cdot (\tan\gamma \cdot \tan\psi + 1) \quad \text{(Equation 22)}$$

Accordingly, substituting Equation 9 for AD of Equation 21 yields:

$$AC = BC = \{x + z[\tan(\alpha + \theta/2) - \tan|\alpha - \theta/2|]\} \cdot (\tan\gamma \cdot \tan\psi + 1)/2\cos^2\gamma \quad \text{(Equation 23)}$$

Further, since:

$$AB = BH/\sin\gamma = [BI + HI]/\sin\gamma \quad \text{(Equation 24)}$$

then, substituting Equation 18 and Equation 11 for BI and HI of Equation 24 yields.

$$AB = AD \cdot \tan\gamma(\tan\gamma \cdot \tan\psi + 1)/\sin\gamma \quad \text{(Equation 25)}$$

Accordingly, substituting Equation 9 for AD of Equation 25 yields:

$$AB = \{x + z[\tan(\alpha + \theta/2) - \tan|\alpha - \theta/2|]\} \cdot (\tan\gamma \cdot \tan\psi + 1)/\cos\gamma \quad \text{(Equation 26)}$$

The length of each side of the apices ABC of prism 61 that takes the form of an isosceles triangle can be determined based on the foregoing explanation, and these are the minimum lengths of each side of prism 61.

Figure 7:
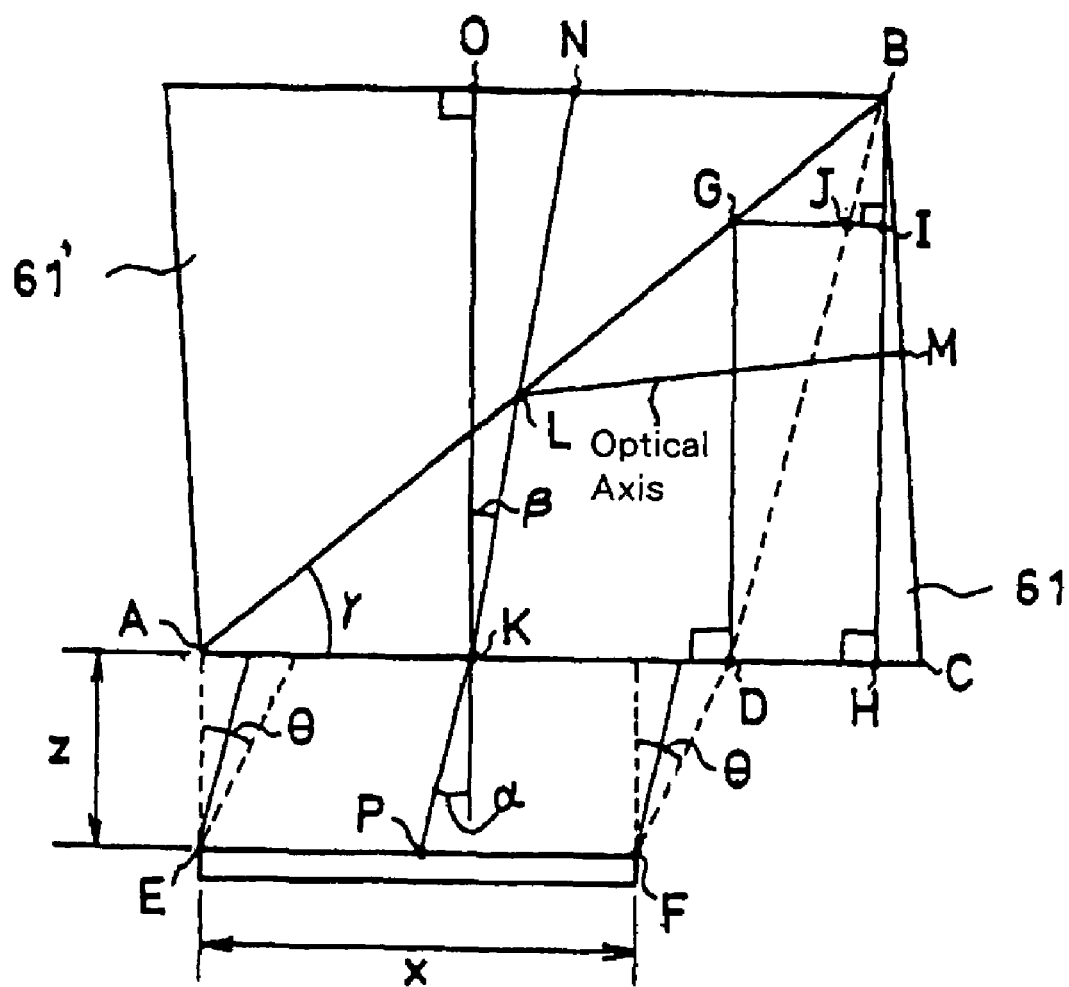
FIG. 7 is a schematic side view for explaining the method of finding the minimum thickness dimension of a lens-integral prism.

The minimum size of prism 61 in the direction of thickness (the direction perpendicular to the plane of the figure) is next determined. The length of the optical axis of flux that is reflected at the center of DMD 7 to reach surface BC, i.e., emission surface BC, is first found. FIG. 7 schematically shows the state in which prism 61 and a similar prism 61' are joined together at the base surfaces and flux from DMD 7 is transmitted as far as prism 61' without being reflected at total internal reflection surface AB. KLN shows the flux at this time.

In this case, prisms 61 and 61' have the same isosceles triangular shape, and as a result:

$$KL + LM = KN \quad \text{(Equation 27)}$$

Here:

$$KN = OK/\cos\beta = BH/\cos\beta \quad \text{(Equation 28)}$$

The length PK of the optical axis from DMD to the prism is:

$$PK = z/\cos\alpha \quad \text{(Equation 29)}$$

Distance 1 for the optical axis of flux that is reflected at the center of DMD 7 to reach emission surface BC, based on Equation 28, Equation 29, and BH of Equation 22 is:

$$1 = PK + KN = [z/\cos\alpha] + [AD \cdot \tan\gamma(\tan\gamma \cdot \tan\psi + 1)/\cos\beta] \quad \text{(Equation 30)}$$

Since flux has a cone-shaped spread, the diameter R of the circle of flux that is reflected at the center of DMD 7, that spreads at an angle $\theta$, and that has traveled a distance 1 can be found by using Equation 30:

$$R = 2 \cdot 1 \cdot \tan(\theta/2) = 2\tan(\theta/2) \cdot \{[z/\cos\alpha] + [AD \cdot \tan\gamma(\tan\gamma \cdot \tan\psi + 1)/\cos\beta]\} \quad \text{(Equation 31)}$$

Accordingly, the minimum thickness Y of prism 61 can be found by adding length y of the thickness of the DMD to the diameter R of the circle that has been found, and based on Equation 30, this is:

$$Y = 2\tan(\theta/2) \cdot \{[z/\cos\alpha] + [AD \cdot \tan\gamma(\tan\gamma \cdot \tan\psi + 1)/\cos\beta]\} + y \quad \text{(Equation 32)}$$

The above-described Equation 23, Equation 26, and Equation 32 are the minimum dimensions for sides AC, BC, AB and thickness Y of a suitable prism that is used in the projection display device of the present invention.

In this case, the size and thickness of prism 61 is determined by the F-number of projection lens 8 and the size of the effective area of DMD 7, but finding the accurate prism size obviously requires finding the angle of incidence of the optical axis to prism 61 of flux that is reflected by DMD 7 and the distance between DMD 7 and prism 61. FIG. 8 shows two examples for finding the thickness Y and the length of each side AB, AC, and BC of prism 61 when the angle of incidence $\alpha$ of flux to prism 61 is 5° and the distance z between DMD 7 and prism 61 is 10 mm.

The image display element in the present invention is not limited to the above-described DMD, and the present invention can also be applied to a projection display device that uses a reflecting liquid crystal panel.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A projection display device, comprising:
a relay lens for converting a flux that is emitted from a light source into a parallel flux for illuminating an image display element; and
a single total internal reflection prism that both guides the flux that is emitted from said relay lens to said image display element and directs the flux that is reflected by said image display element toward a projection lens, said total internal reflection prism shaped as an isosceles triangular prism having a first side surface, a second side surface, and a third side surface, said first side surface forming a total internal reflection surface, said second side surface being arranged facing said image display element, and said third side surface being arranged facing said projection lens;
wherein said total internal reflection prism is arranged on a light path between said relay lens and said image display element, and
said relay lens is a plano-convex lens having a planar surface and flat portions that are made by cutting at least a part of a circumference of said plano-convex lens, said planar surface is arranged on said total internal reflection surface of said total internal reflection prism opposite to each other at an interval.

2. The projection display device according to claim 1, wherein said relay lens is integrated with said total internal reflection prism.

3. The projection display device according to claim 2, wherein said relay lens is bonded with said total internal reflection prism via an adhesive.

4. The projection display device according to claim 3, wherein a reinforcing plate is provided for joining said relay lens and said total internal reflection prism.

5. The projection display device according to claim 3, wherein a micro-space air gap is interposed between said relay lens and said total internal reflection prism.

6. The projection display device according to claim 3, wherein said adhesive includes a glass bead.

7. The projection display device according to claim 1, wherein at least two flat portions are provided, each flat portion being arranged along a respective edge of said total internal reflection surface of said total internal reflection prism.

8. The projection display device according to claim 4, wherein said reinforcing plate is adhered to said flat portion of said relay lens and to a surface of said total internal reflection prism.

9. The projection display device according to claim 1, wherein a lens edge and a sand-floated surface of said relay lens are treated with a black-coating process.

10. A projection display device, comprising:
a relay lens for converting a flux that is emitted from a light source into a parallel flux for illuminating an image display element, said relay lens being a plano-convex lens having a planar surface and flat portions that are made by cutting at least a part of a circumference of said plano-convex lens, and having a lens edge and a sand-floated surface of said relay lens treated with a black-coating process; and
a single total internal reflection prism that both guides the flux that is emitted from said relay lens to said image display element and directs the flux that is reflected by said image display element toward a projection lens, said total internal reflection prism being arranged on a light path between said relay lens and said image display element
wherein, said planar surface of said relay lens is arranged on said total internal reflection surface of said total internal reflection prism opposite to each other at an interval.

11. The projection display device according to claim 10, wherein said total internal reflection prism is shaped as a triangular prism having a first side surface, a second side surface, and a third side surface, said first side surface forming a total internal reflection surface, said second side surface being arranged facing said image display element, and said third side surface being arranged facing said projection lens.

12. The projection display device according to claim 10, wherein said relay lens is integrated with said total internal reflection prism.

13. The projection display device according to claim 12, wherein said relay lens is bonded with said total internal reflection prism via an adhesive.

14. The projection display device according to claim 13, wherein a reinforcing plate is provided for joining said relay lens and said total internal reflection prism.

15. The projection display device according to claim 14, wherein said reinforcing plate is adhered to said flat portion of said relay lens and to a surface of said total internal reflection prism.

16. The projection display device according to claim 13, wherein a micro-space air gap is interposed between said relay lens and said total internal reflection prism.

17. The projection display device according to claim 13, wherein said adhesive includes a glass bead.

18. The projection display device according to claim 10, wherein at least two flat portions are provided, each flat portion being arranged along a respective edge of said total internal reflection surface of said total internal reflection prism.

* * * * *